United States Patent [19]

Weiss

[11] Patent Number: 5,284,066
[45] Date of Patent: Feb. 8, 1994

[54] AUTOMATIC PEDAL

[76] Inventor: Jonathan Weiss, 3675 Clarington Ave., #1, Los Angeles, Calif. 90034

[21] Appl. No.: 696,303

[22] Filed: Apr. 29, 1991

Related U.S. Application Data

[63] Continuation of Ser. No. 86,578, Aug. 18, 1987, abandoned.

[51] Int. Cl.⁵ .................................................. G05G 1/14
[52] U.S. Cl. ..................................... 74/594.6; 36/131; 74/594.4
[58] Field of Search ........................ 74/594.4–594.6; 36/131

[56] References Cited

U.S. PATENT DOCUMENTS

| 550,409 | 11/1895 | Hanson | 74/594.6 |
|---|---|---|---|
| 595,388 | 12/1897 | Hanson | 74/594.6 |
| 598,325 | 2/1898 | McIntire | 74/594.6 |
| 2,678,507 | 5/1954 | Dye | 36/134 X |
| 3,858,996 | 1/1975 | Jarvis | 403/353 |
| 4,014,115 | 3/1977 | Reichert | 36/137 |
| 4,377,952 | 3/1983 | Gamondes | 36/131 X |
| 4,642,910 | 2/1987 | Carter et al. | 36/131 |
| 4,646,586 | 3/1987 | Rapisarda | 74/594.6 |
| 4,662,090 | 5/1987 | Solano | 36/131 |
| 4,712,319 | 12/1987 | Goria | 36/137 |
| 4,739,564 | 4/1988 | Eser | 36/131 |

FOREIGN PATENT DOCUMENTS

| 0015803 | 9/1980 | European Pat. Off. | 74/594.6 |
|---|---|---|---|
| 0193472 | 9/1986 | European Pat. Off. | 74/594.6 |
| 3221429 | 12/1983 | Fed. Rep. of Germany | 74/594.6 |
| 3315282 | 10/1984 | Fed. Rep. of Germany | 74/594.6 |
| 3329993 | 3/1985 | Fed. Rep. of Germany | 74/594.6 |
| 3426103 | 1/1986 | Fed. Rep. of Germany | 74/594.6 |
| 3507735 | 9/1986 | Fed. Rep. of Germany | 74/594.6 |
| 2432427 | 2/1980 | France | 74/594.6 |
| 2464661 | 3/1981 | France | 74/594.6 |
| 183582 | 10/1980 | Italy | 74/594.6 |
| 8707119 | 12/1987 | PCT Int'l Appl. | 36/131 |
| 8707120 | 12/1987 | PCT Int'l Appl. | 36/131 |

*Primary Examiner*—Vinh T. Luong

[57] ABSTRACT

A peg is securable to each shoe and is releasably attachable to a bracket secured to each bicycle pedal. The bracket is securable to a conventional bicycle pedal for example by using screws and screw holes normally provided on conventional pedals for mounting reflectors, or the like, thereon. The peg is securable to the bottom of a conventional riding shoe for example by using the screw holes and screws normally provided on conventional riding shoes for mounting a cleat, or the like, thereon. The peg is shaped so as to fit into an aperture formed in the bracket and to constantly abut the edge of the aperture upon insertion. In one embodiment, the peg is provided with spiral shaped slots and the bracket with tabs, which operate together to releasably attach the peg to the bracket in a screw-threading manner.

18 Claims, 8 Drawing Sheets

AUTOMATIC PEDAL

This is a continuation of application Ser. No. 07/086,578 filed on Aug. 18, 1987, now abandoned.

BACKGROUND OF THE INVENTION

1. Field of the Invention

The present invention is directed to an improvement of an automatic pedal device for attaching a bicycle rider's shoes to the pedals of a bicycle.

2. Description of Related Art

Bicycle rider's have found it advantageous to secure their shoes to the pedals of a bicycle so as to provide means for applying a lifting force, as well as a pushing force, to the pedals. Thus, while one pedal is being pushed downward by one of the rider's legs, the other pedal is lifted upwards by the other of the rider's legs.

It is an object of the present invention to provide an improved automatic pedal device wherein a bicycle rider can quickly and easily secure his shoes to the bicycle pedals without the use of his hands.

It is also an object of the present invention to provide an improved automatic pedal device wherein a bicycle rider can quickly and easily release his shoes from the bicycle pedals without the use of his hands.

It is also an object of the present invention to provide an improved automatic pedal device which can be attached to conventional bicycle pedals and conventional riding shoes without substantial modification of either of the pedals or the shoes.

The foregoing and other objects, advantages, and features of the invention as well as presently preferred embodiments thereof will become more apparent from the following description in connection with the accompanying drawings.

SUMMARY OF THE INVENTION

The present invention is directed to an automatic pedal which provides means for quickly and easily securing and releasing a bicycle rider's shoes to bicycle pedals. In the preferred embodiments, a peg secured to each shoe is releaseably attachable to a bracket secured to each of the pedals. The bracket is adapted to fit on, and be secured to, a conventional bicycle pedal by using screws and screw holes normally provided on conventional pedals for mounting reflectors, or the like, thereon. The peg is adapted to be secured to the bottom of a conventional riding shoe by using the screw holes and screws normally provided on conventional riding shoes for mounting a cleat, or the like, thereon.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention.

The following descriptions pertain to embodiments of the present invention as they relate to a single shoe and a single bicycle pedal. The descriptions however are intended to relate to both shoes and both pedals, since they operate in the same manner.

Figure 1:
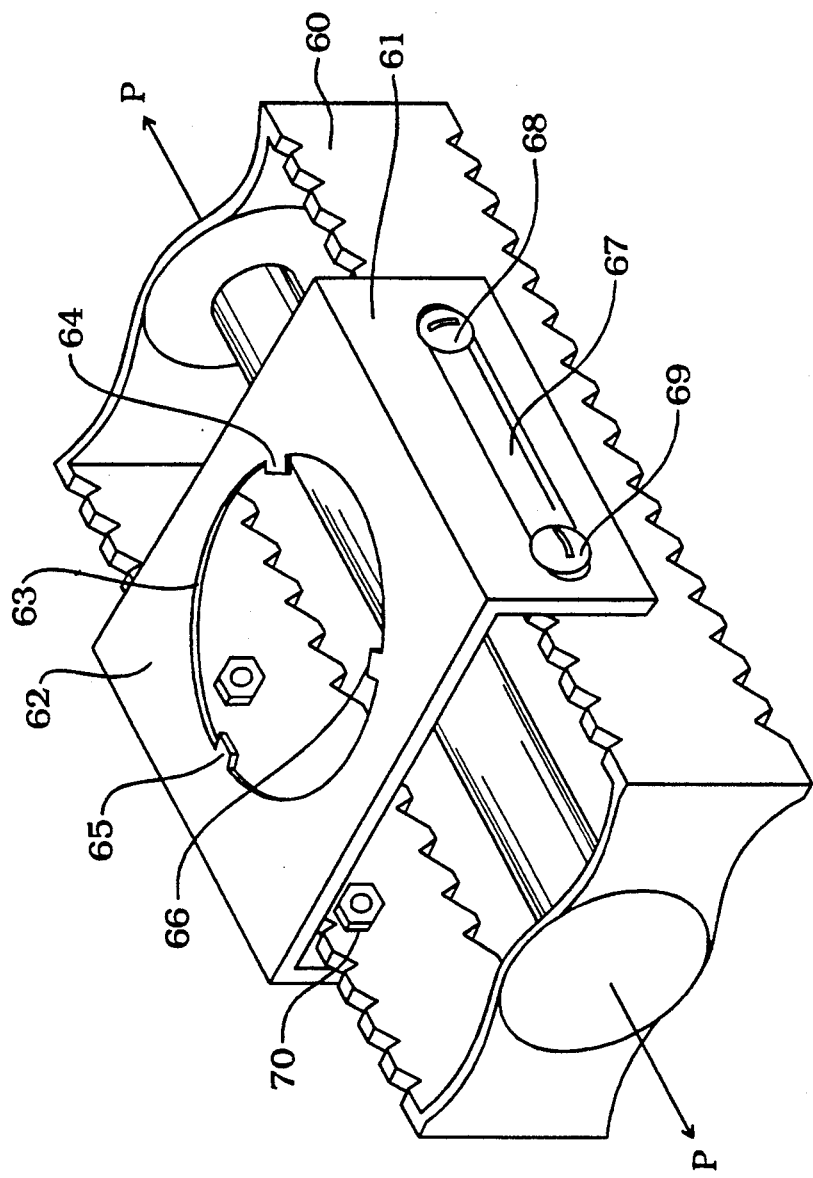
FIG. 1 shows an embodiment of a bracket attached to a conventional bicycle pedal.

FIGS. 1-4 show one embodiment of the present invention. As shown in FIG. 1, a bracket 62 is configured to fit over a conventional bicycle pedal 60. The bracket 62 is secured to the pedal by suitable means such as screws 68 and 69 and nuts 70. An elongated hole 67 located in the sides 61 of the bracket aligns with screw holes normally formed in conventional pedals for mounting reflectors (not shown). The elongated shape of the hole 67 ensures that such alignment will occur when the bracket 62 is placed on a conventional pedal 60. The elongated shape of the hole 67 also allows positioning of the bracket 62 at the rider's preferred position along the pedal axis P. A circular hole 63 is located in the top of the bracket. Three (but not limited to three) tabs 64, 65 and 66 extend from the edge of the hole 63 towards the center of the hole and are adapted to engage, in a screw thread manner, with spiral slots (FIG. 2 (74)) formed on a cylindrical peg secured to a shoe.

Figure 2:
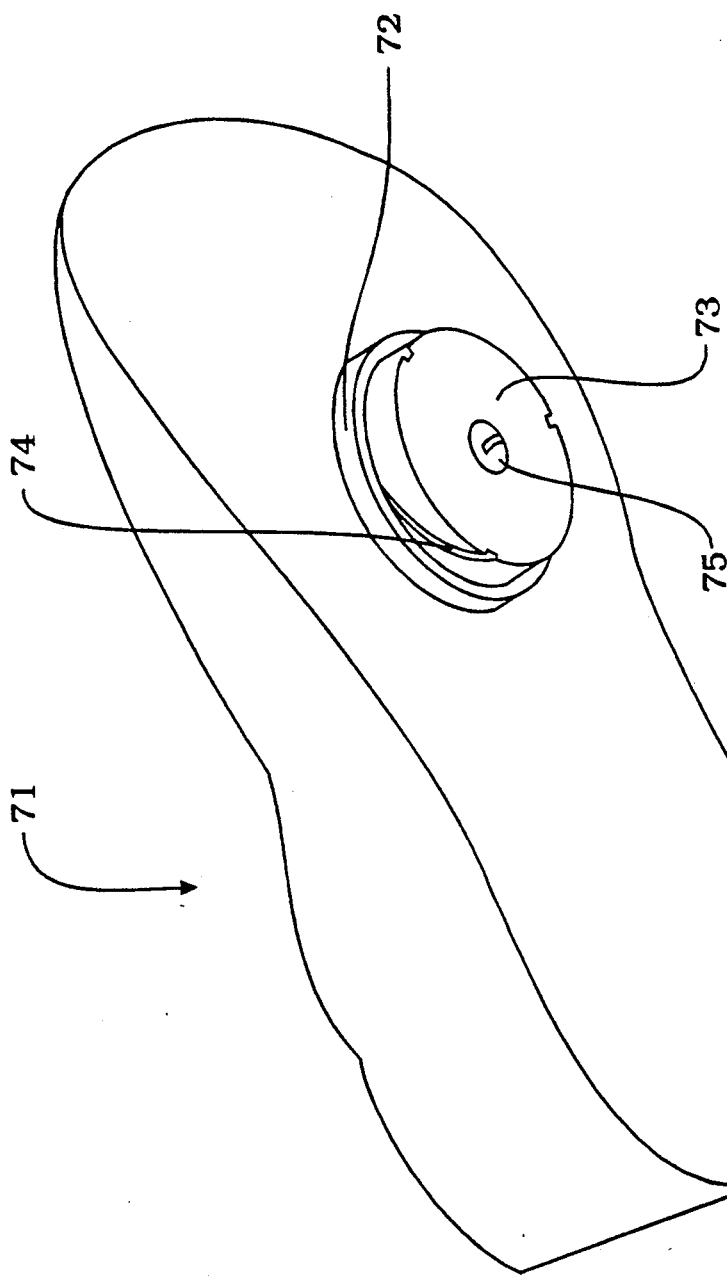
FIG. 2 shows an embodiment of a peg attached to a shoe.
Figure 4:
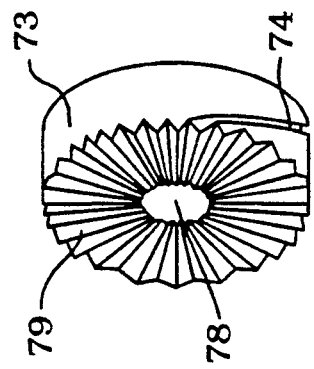
FIG. 4 shows an embodiment of the peg in FIG. 2 without the base.
Figure 3:
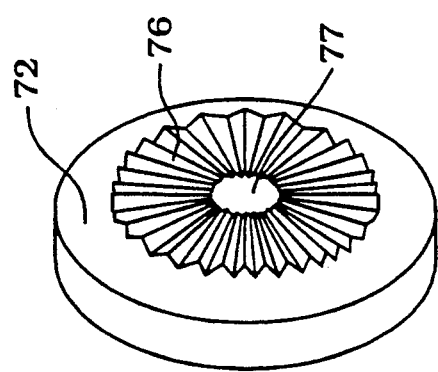
FIG. 3 shows an embodiment of the base of the peg.
Figure 8:
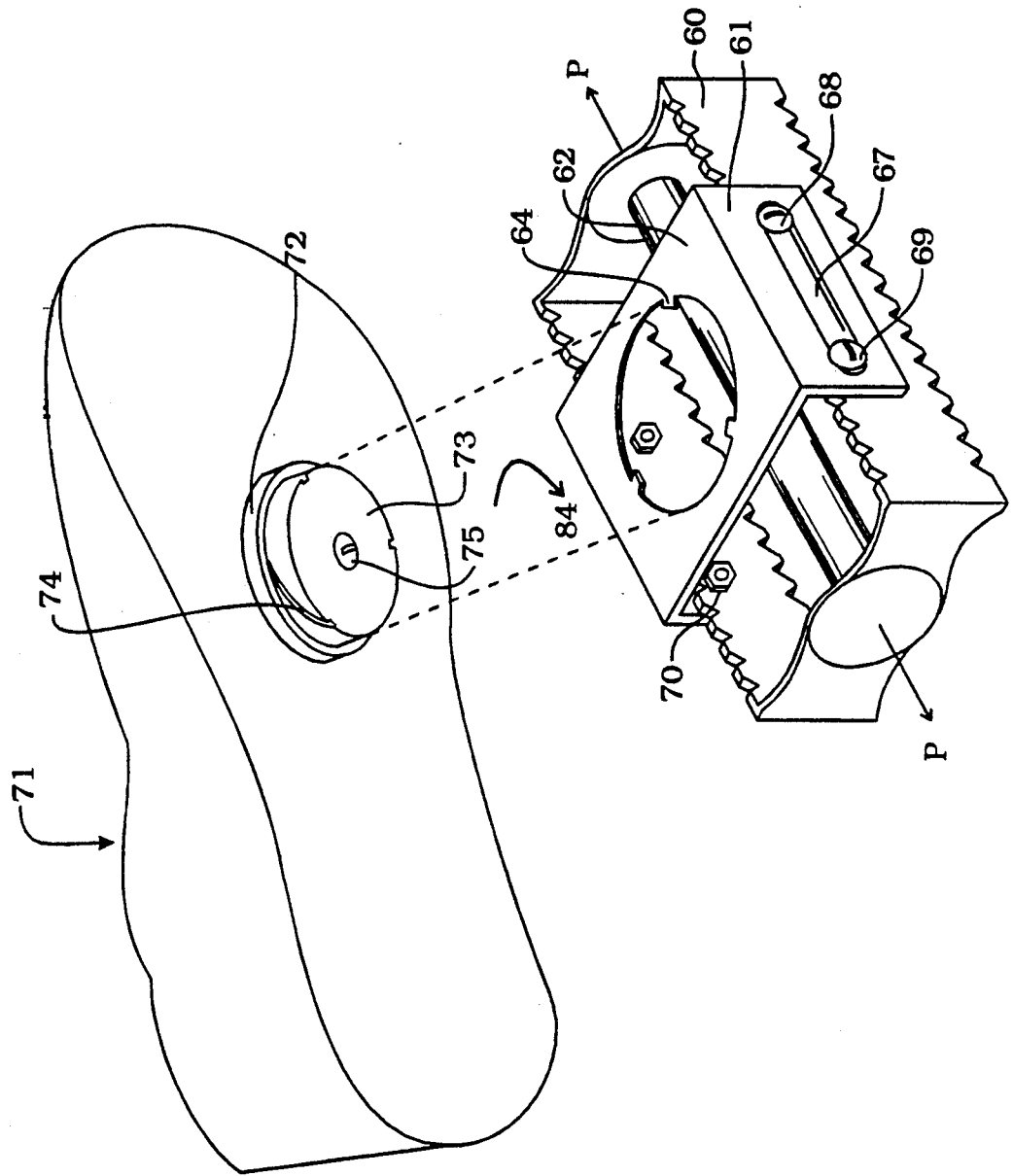
FIG. 8 shows a shoe being secured to a pedal with apparatus according to the embodiment in FIGS. 1 and 2.
Figure 9:
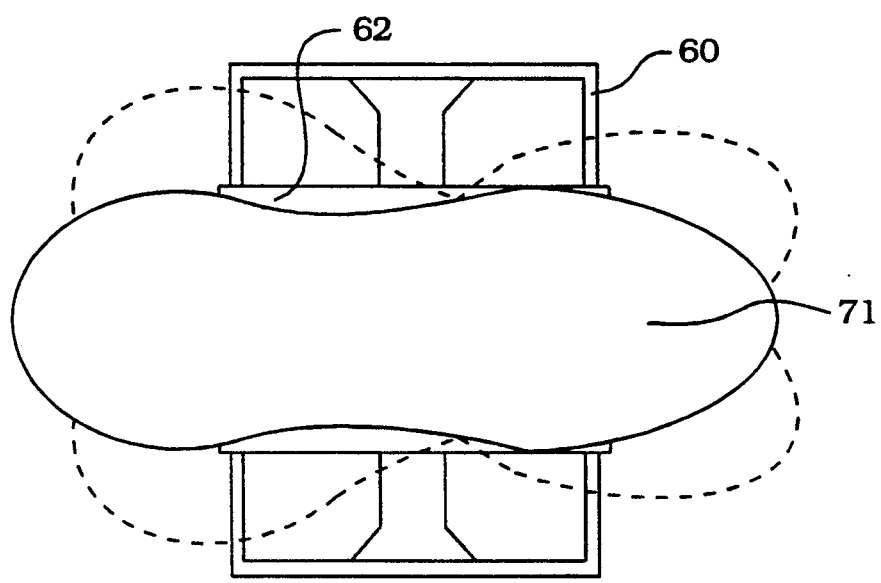
FIG. 9 shows a a shoe secured to a pedal in various riding positions.

FIG. 2 shows a shoe 71 having the aforementioned peg 73 secured to the sole. The peg 73 extends outward from the sole of a shoe 71 and is secured thereto by suitable means, such as a screw 75. The screw hole (FIG. 4 (78)) may be positioned so as to align with holes normally provided in conventional riding shoes for mounting a cleat (not shown) thereon. Slots 74, being spiral shaped, are formed on the peg 73 and are adapted to align with the tabs 64, 65, and 66 on the bracket 62. By aligning the slots 74 with the tabs 64, 65 and 66, and twisting the shoe in one direction, approximately 45 degrees, the tabs are guided in the slots, in a screw threading manner, so as to secure the peg 73 to the bracket 62. This motion to secure the peg 73 to the bracket 62 is shown in FIG. 8 with arrow 84. FIG. 9 shows the position of the shoe 71 with respect to the pedal 60 upon the peg 73 being secured with the bracket 62. In this manner, a bicycle rider can quickly and easily secure his shoe to the pedal of his bicycle. By twisting his shoe in the other direction (opposite to arrow 84), the tabs 64, 65 and 66 are guided out of the slots 74 and the peg 73 is released from the bracket 62. In this manner, a bicycle rider can quickly and easily release his shoe 71 from the bicycle pedal 60, even while the bicycle is in motion.

Each slot 74 shown in FIG. 2 begins at the bottom of peg 73 and ascend upward and partially around the peg, forming a partial spiral. The slots 74 can be formed so as to ascend upward and clockwise around the peg or upward and counterclockwise. It has been found that best results are obtained if the slots on the peg attached to the right shoe ascend upward and clockwise, while the slots formed on the peg attached to the left shoe ascend upward and counterclockwise. The twisting action of each foot will, thereby, be directed from a shoe position with the toe turned slightly inward toward the bicycle to a normal riding shoe position, in order to secure the shoe to the pedal. The twisting action of each foot, from a normal riding shoe position, to a shoe position with the toes directed slightly inward will, thereby, effect the release of the shoe from the pedal.

In the preferred embodiment, peg 73 includes a base 72 having a slightly larger radius. Preferably, the base 72 is formed as a separate piece with respect to peg 73 (see FIGS. 3 and 4). An annular array of ridges and grooves 76 formed on the base 72 is adapted to engage with a similar annular array 79 formed on the peg 73. The base 72 may also include an outwardly extending tab (not shown), extending from the opposite side than that of the annular array 79, for engaging with an inwardly directed notch (not shown) in the sole of the shoe. When engaged, the aforementioned tab and notch will prohibit rotation of the base and the peg about the screw 75.

The base 72 and the peg 73 each include at least one hole 77 and 78 through which at least one screw 75 is inserted for attaching the base and the peg onto a shoe 71. When engaged, the annular arrays of ridges and grooves 76 and 79 prohibit the peg 73 from rotating about the screw 75. The annular arrays of ridges and grooves 76 and 79 also allow a rider to position the threads 74, with respect to the base 72 and the shoe 71, such that the rider's preferred toe position (e.g., such as shown in solid lines in FIG. 9) will be achieved when the peg 73 is secured to the bracket 62. Thus, if a rider prefers to ride with his toes directed slightly inward or slightly outward, the peg 73 can be fitted with the base 72 so that the rider's shoe assumes the preferred direction (e.g., such as shown in broken lines in FIG. 9) when the peg 73 and the shoe are secured to the bracket 62 and the pedal 60.

Figure 5:
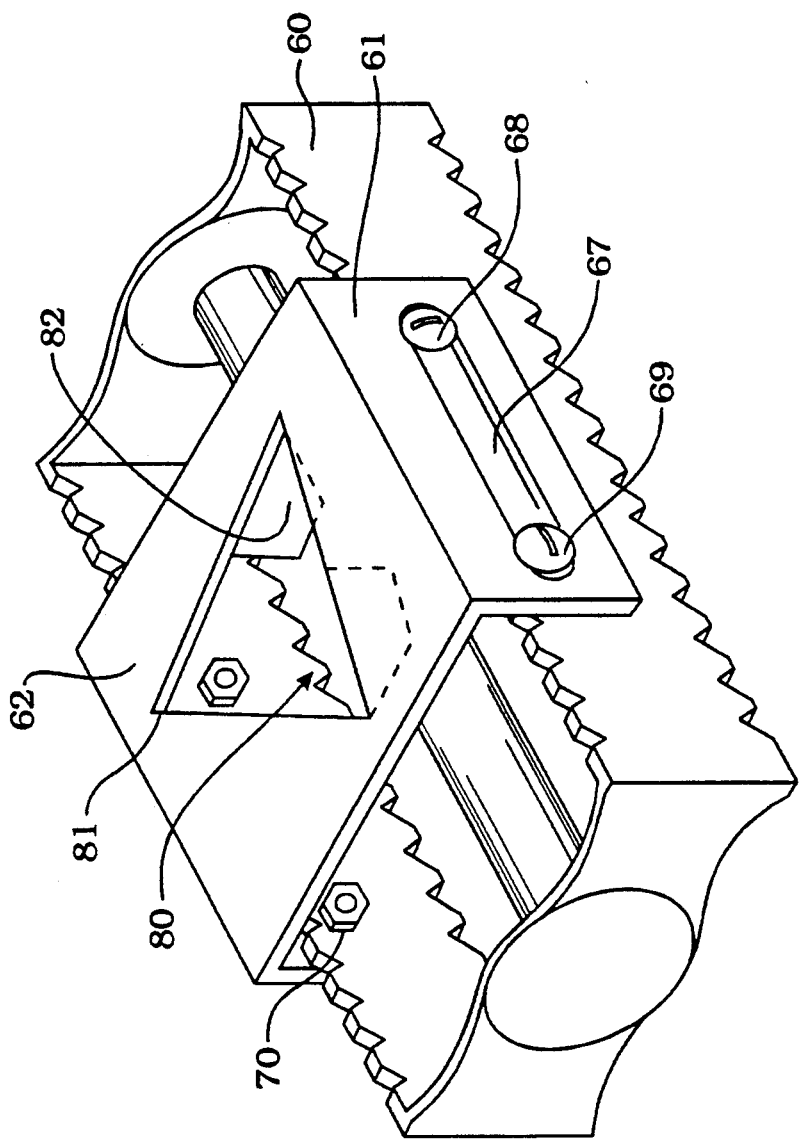
FIG. 5 shows another embodiment of a bracket attached to a conventional bicycle pedal.
Figure 6:
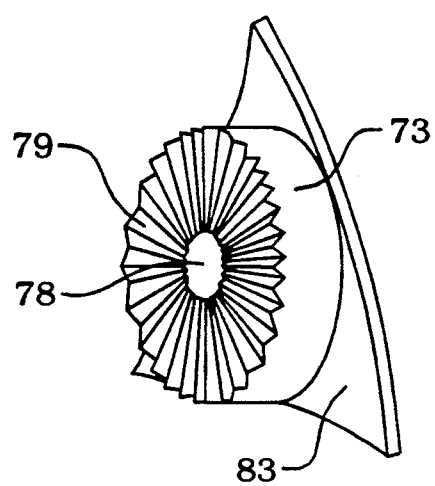
FIG. 6 shows another embodiment of the peg without the base.
Figure 7:
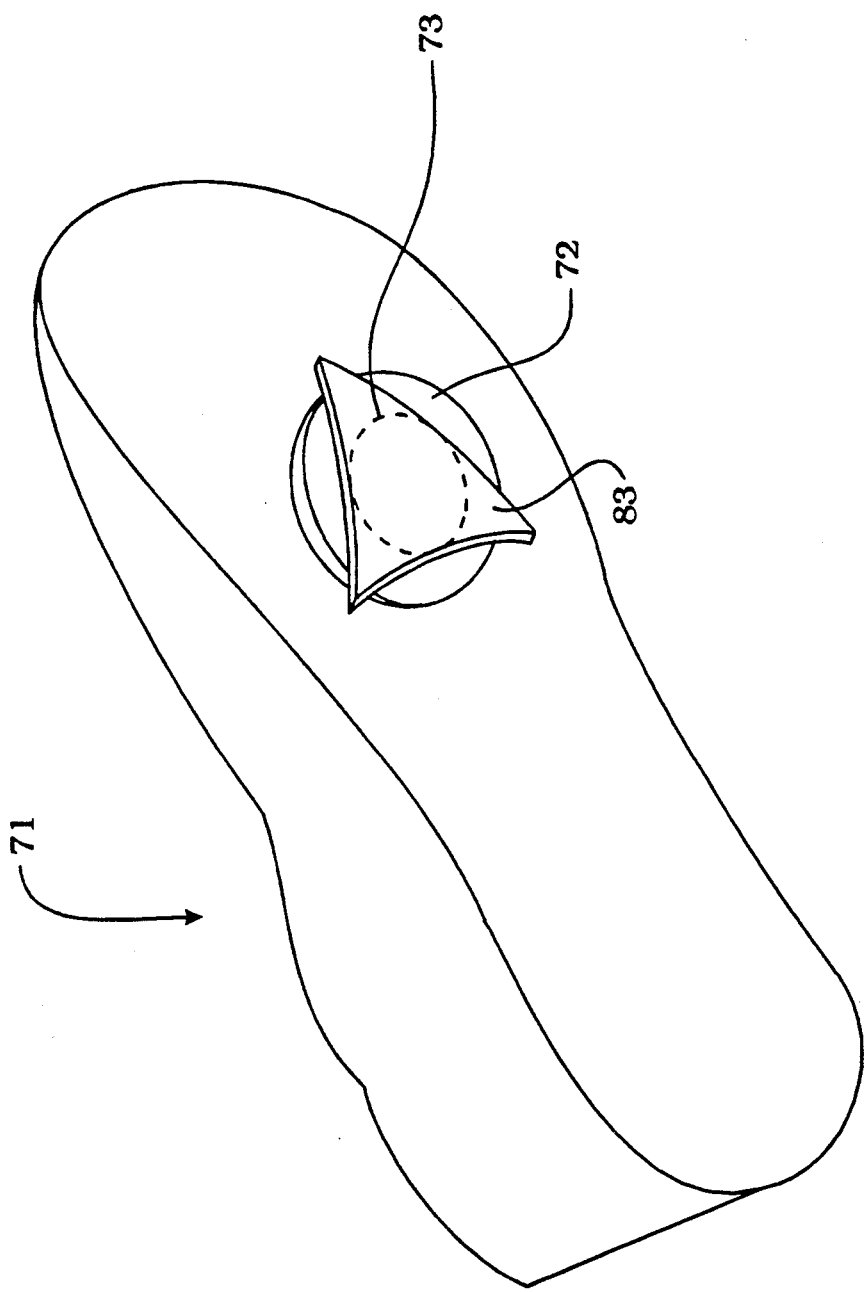
FIG. 7 shows the embodiment of the peg in FIG. 6 attached to a shoe.

FIGS. 5-7 show another embodiment of the present invention. In this embodiment, the bracket 62 has a triangular hole 80 formed in the top thereof. Other shapes can be employed, however, the proceeding description incorporates the aforementioned triangular hole.

The peg 73, shown in FIG. 6, has attached thereto a triangular member 83. On the side of peg 73, opposite to the side where the triangular member 83 is attached, is formed the annular array of ridges and grooves 79 as previously described. FIG. 7 shows the peg 73, the triangular member 83 and the base 72 secured to the sole of a shoe 71.

By inserting the triangular member 83 into the triangular hole 80 and rotating the foot in one direction, the corners of the triangular member will slide along the bottom of the bracket 62 and come to rest against stops 82. The triangular member 83 is bowed so that the corners of the triangle press against the bottom of the bracket 62. The peg 73 is sized so as to tangentially contact each of the three edges of the triangular hole 80 when the triangular member 83 is inserted in the hole 80. In this manner, the peg 73 can be secured to the bracket 62 in a tight fitting manner, thereby preventing vibrational movement between the peg 73 and the bracket 62.

Thus, a rider may secure this shoes to the bicycle pedals by inserting the peg 73 and the triangular member 83 into the hole 80 and turning his feet in one direction. The triangular member 83 will abut the stops 82 when the rider's foot is turned to the rider's preferred riding position. The rider may adjust the preferred riding position of his foot by adjusting the position of the triangular member 83 with respect to the shoe 71. This is achieved by adjusting the position of peg 73 with respect to the base 72 prior to engagement of the annular array 79 with annular array 76. Once engaged, the annular arrays 79 and 76 prohibit movement of the peg 73 with respect to the base 72.

The rider may release his shoes from the pedals by merely turning his feet in the other direction, to the point where the triangular member 83 aligns with the hole 80, and lifting his feet off of the pedals. Thus, the rider can quickly and easily release his shoes from the pedals without the use of his hands.

The presently disclosed embodiments are to be considered in all respects as illustrative and not restrictive, the scope of the invention being indicated by the appended claims, rather than the foregoing description, and all changes which come within the meaning and range of equivalency of the claims are, therefore, intended to be embraced therein.

What is claimed is:

1. An apparatus for releasably attaching a bicycle rider's shoe to a bicycle pedal, said apparatus comprising:
    a first member;
    first securing means for securing the first member to the bicycle rider's shoe;
    a second member;
    second securing means for securing the second member to the pedal so as to substantially preclude upward vertical movement of the second member with respect to the pedal, independent of the bicycle rider's shoe;
    the second member having at least one releasable attaching means for engaging the at least one spiral shaped slot and for releasably attaching the first member with the second member in a screw threading manner while the second member is secured to the pedal by the second securing means.

2. An apparatus as claimed in claim 1, wherein said releasably attaching means (the top surface of 62 and tabs 64, 65 and 66) includes means (tabs 64, 65 and 66) for releasably attaching said first member (73), at a particular riding position, to said second member (62); and said first member (73) includes adjustment means (76 and 79) for adjusting said particular riding position.

3. An apparatus as claimed in claim 2, wherein said adjustment means (76 and 79) comprises:
    a first body (72 in FIG. 3) securable to said shoe, said first body having a first surface, said first surface having a first annular array of ridges and grooves (76) which extend radially outward from the center of said first annular array; and
    a second body (see FIG. 4) having a second surface, said second surface having a second annular array of ridges and grooves (79), said second annular array (79) being shaped to mesh with said first annular array (76).

4. An apparatus as claimed in claim 1, further comprising positioning means (the ends of slots 74 which are next to the base 72) for positioning said first member (73) at a particular position with respect to said second member (62) upon attachment of said first member with said second member.

5. An apparatus as claimed in claim 4, further comprising adjustment means (76 and 79) for variably adjusting said particular positions at which said positioning means (the ends of slots 74 which are next to the base 72) positions said first member (73) with respect to said second member (62).

6. An apparatus as claimed in claim 5, wherein said adjustment means (76 and 79) comprises:
a first body (72 in FIG. 3) securable to said shoe, said first body having a first surface, said first surface having a first annular array of ridges and grooves (76) which extend radially outward from the center of said first surface, said second surface having a second annular array of ridges and grooves (79), said second annular array (79) being shaped to mesh with said first annular array (76).

7. Apparatus as claimed in claim 1, wherein the second securing means (68, 69 and 70) comprises at least one threaded connector (68 and 69) adapted to extend through the second member (62) and the pedal.

8. Apparatus as claimed in claim 1, wherein the second securing means (68, 69 and 70) comprises at least one screw (68 and 69) adapted to extend through the second member (62) and the pedal.

9. An apparatus for releasably attaching a bicycle rider's shoe to a bicycle pedal, said apparatus comprising:
a peg having a first end and a second end extended from the shoe;
means for securing the first end of the peg to the shoe in a fixed position with respect to the shoe;
a bracket having a top surface provided with an aperture therein, the aperture being shaped to receive the peg upon insertion of the peg downward through the aperture, the aperture having an edge which constantly abuts the peg upon the peg being received in the aperture;
means for securing the bracket to the pedal in a fixed position with respect to the pedal independent of the bicycle rider's shoe; and
releasable attaching means, provided on the peg and spaced from the first end of the peg, for releasably attaching the peg to the bracket upon inserting the peg in the aperture and turning the peg with respect to the bracket while the peg is secured to the shoe and while the bracket is secured to the pedal;
wherein the releasably attaching means includes means for releasably attaching the peg, at a particular riding position, to the bracket; and the peg includes adjustment means for adjusting the particular riding position.

10. An apparatus as claimed in claim 9, wherein said aperture in the top portion of said second member is substantially triangular shaped.

11. An apparatus as claimed in claim 10, further comprising a substantially triangular shaped third member disposed on said peg.

12. An apparatus as claimed in claim 9, wherein said adjustment means (76 and 79) comprises:

a first body (72 in FIGS. 3 or 7) securable to said shoe, said first body having a first surface, said first surface having a first annular array of ridges and grooves (76) which extend radially outward from the center of said first annular array; and
a second body (see FIGS. 4 or 6) having a second surface, said second surface having a second annular array of ridges and grooves (79), said second annular array (79) being shaped to mesh with said first annular array (76).

13. Apparatus as claimed in claim 9, wherein the means (68, 69 and 70) for securing the bracket (62) to the pedal comprises at least one threaded connector (68 and 69) adapted to extend through the bracket (62) and the pedal.

14. Apparatus as claimed in claim 9, wherein the means (68, 69 and 70) for securing the bracket to the pedal comprises at least one screw (68 and 69) adapted to extend through the bracket (62) and the pedal.

15. An apparatus for releasably attaching a bicycle rider's shoe to a riding position on a bicycle pedal, said apparatus comprising:
a first member (73);
first securing means (75) for securing the first member (73) to the shoe;
a second member (62);
second securing means (68, 69 and 70) for securing the second member (62) to the pedal so as to substantially preclude upward vertical movement of the second member with respect to the pedal;
releasably attaching means (74 or 83) for releasably attaching the first member (73), at the riding position, with the second member (62) while the second member is secured to the pedal by the second securing means (68, 69 and 70);
adjustment means (76 and 79) for adjusting the riding position at which the first member (73) is releasably attached with the second member (62).

16. An apparatus as claimed in claim 15, wherein said first member (73) comprises:
a first body (72) securably to said shoe, said first body having a first surface, said first surface having a first annular array of ridges and grooves (76) which extend radially outward from the center of said first annular array; and
a second body (see FIG. 4) having a second surface, said second surface having a second annular array of ridges and grooves (79), said second annular array (79) being shaped to mesh with said first annular array (76).

17. Apparatus as claimed in claim 15, wherein the second securing means (68, 69 and 70) comprises at least one threaded connector (68 and 69) adapted to extend through the second member (62) and the pedal.

18. Apparatus as claimed in claim 15, wherein the second securing means (68, 69 and 70) comprises at least one screw (68 and 69) adapted to extend through the second member (62) and the pedal.

* * * * *